Jan. 3, 1950     L. E. LA BRIE     2,493,721
CLUTCH
Original Filed Feb. 20, 1941     4 Sheets-Sheet 1
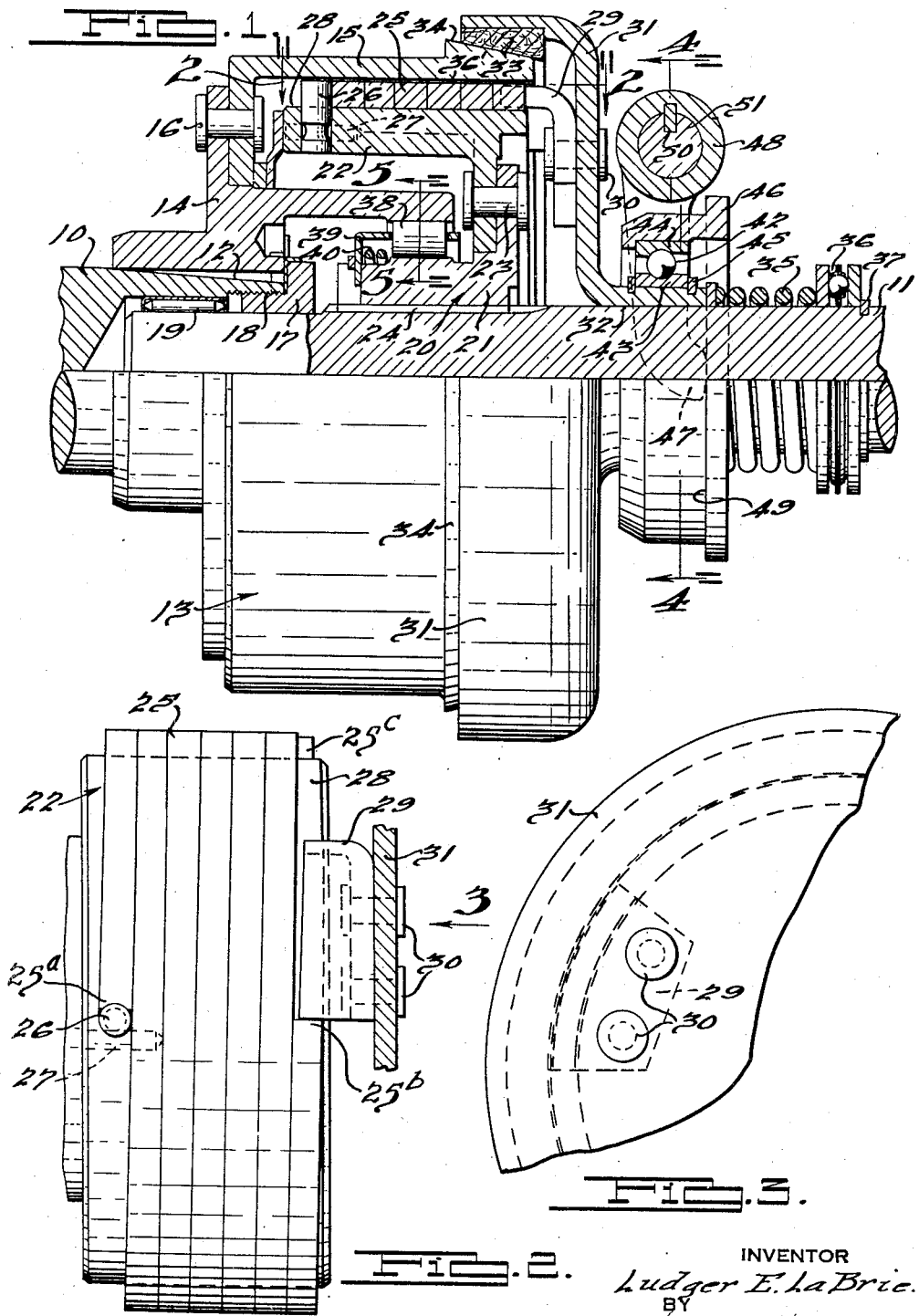
INVENTOR
Ludger E. La Brie.
BY
Harness & Harris
ATTORNEYS.

Jan. 3, 1950      L. E. LA BRIE      2,493,721
CLUTCH
Original Filed Feb. 20, 1941      4 Sheets-Sheet 2
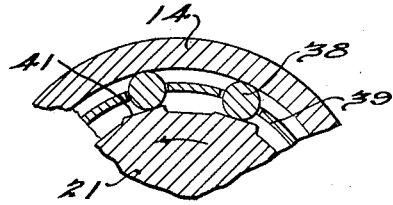
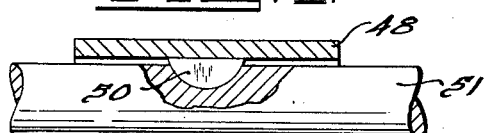
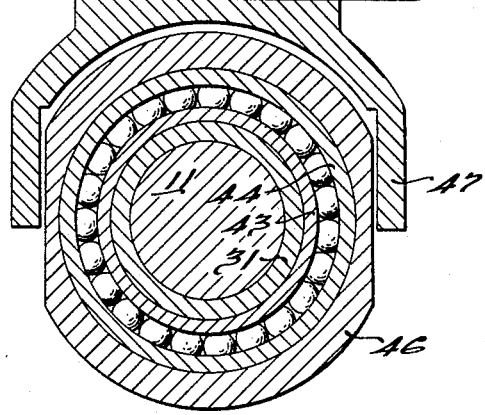
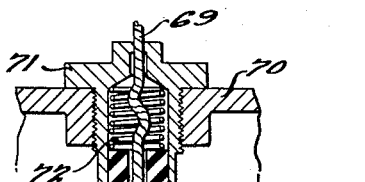
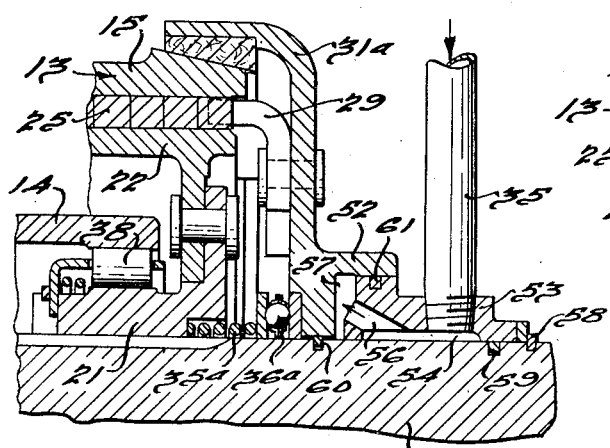
INVENTOR
*Ludger E. LaBrie.*
BY
*Harness & Harness*
ATTORNEYS.

Jan. 3, 1950 L. E. LA BRIE 2,493,721
CLUTCH
Original Filed Feb. 20, 1941 4 Sheets-Sheet 3
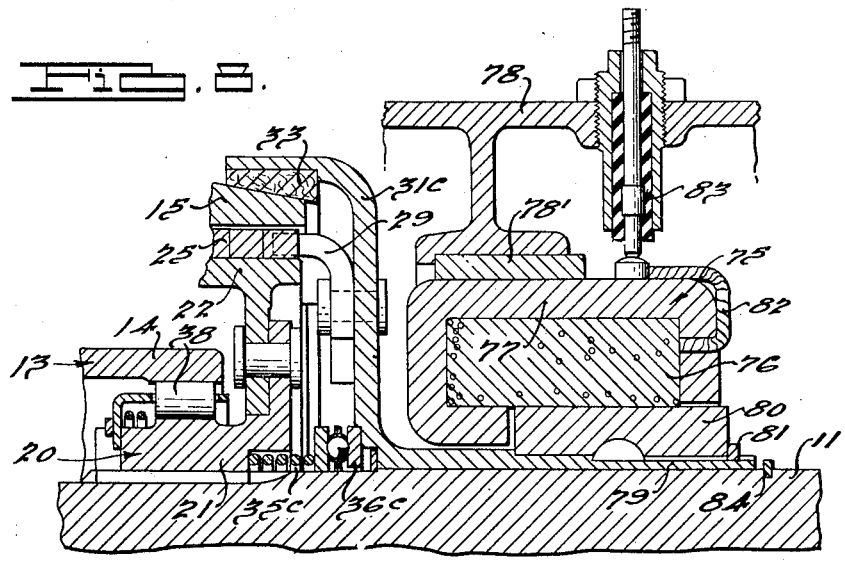
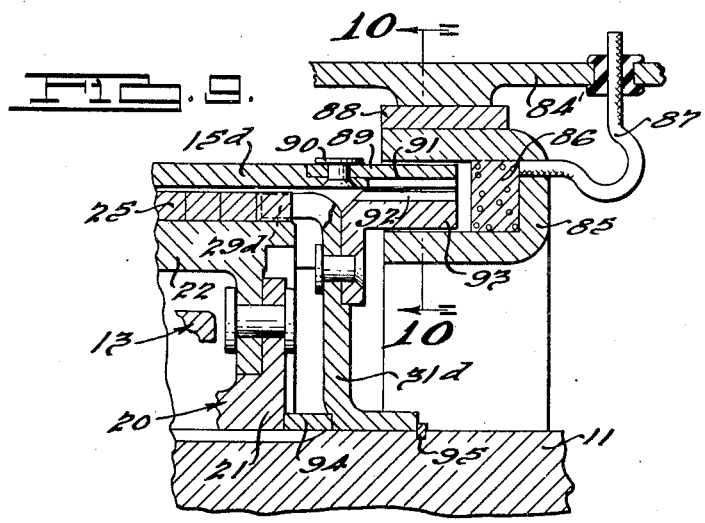
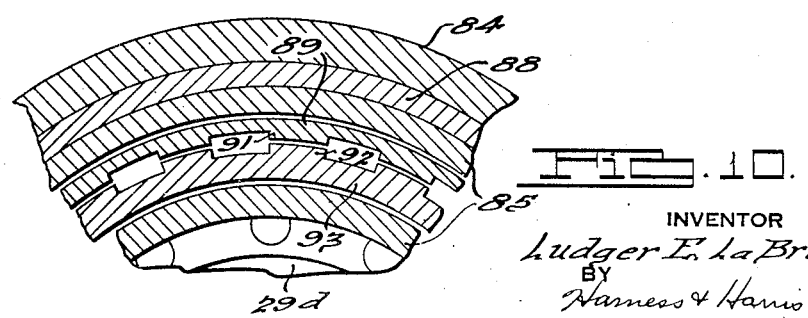
INVENTOR
Ludger E. La Brie.
BY
Harness & Harris
ATTORNEYS.

Jan. 3, 1950
L. E. LA BRIE
2,493,721
CLUTCH
Original Filed Feb. 20, 1941
4 Sheets-Sheet 4
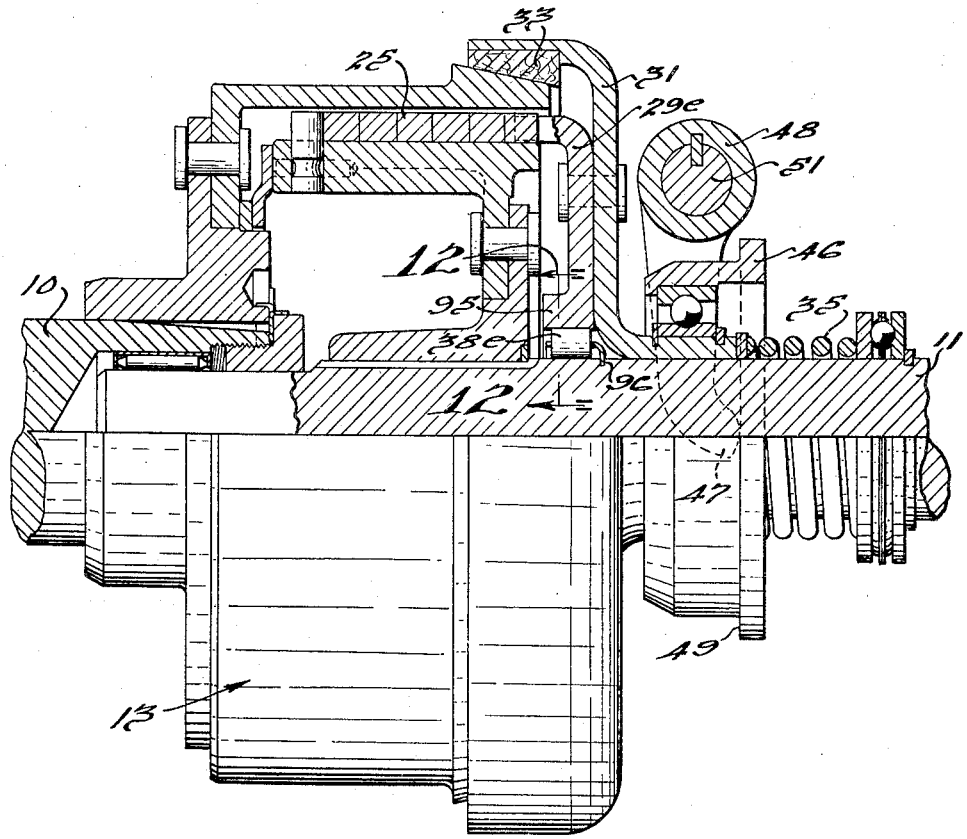
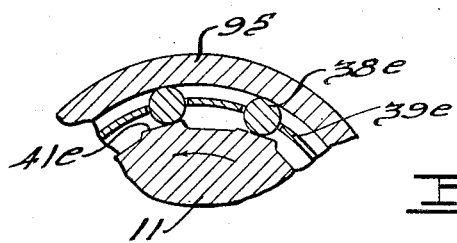
INVENTOR
Ludger E. LaBrie.
BY
Harness & Harris
ATTORNEYS.

Patented Jan. 3, 1950

2,493,721

UNITED STATES PATENT OFFICE 2,493,721

CLUTCH

Ludger E. La Brie, Detroit, Mich., assignor to Chrysler Corporation, Highland Park, Mich., a corporation of Delaware Original application February 20, 1941, Serial No. 379,786, now Patent No. 2,374,688, dated May 1, 1945. Divided and this application April 26, 1945, Serial No. 590,453

10 Claims. (Cl. 172—284)

This invention relates to clutches in general and in particular to clutches of the servo type, and is a division of my copending application Serial No. 379,786, filed February 20, 1941, now Patent No. 2,374,688, dated May 1, 1945.

The principal object of my invention is to provide a servo clutch which is more compact, easier to operate and smoother in operation than those of the prior art.

An additional object is to provide a clutch of this type which is readily adapted for manual or power operation.

A further object is to provide simple and effective means for initiating operation of the servo mechanism for controlling engagement of the clutch.

A still further object is to provide novel and efficient power actuating mechanism for clutches of this general type.

A still further object is to provide an expanding spring type clutch wherein torque may be transmitted in either direction, thus making possible use of clutches of this type in installations where overrunning or "free-wheeling" of one shaft or structure relative to the other is not desired.

Further objects and advantages will become apparent from the following description of preferred embodiments of the invention, reference being made to the accompanying drawings in which:

Fig. 1 is a longitudinal elevational view, partly in section, of an embodiment of the clutch adapted for manual operation;

Fig. 2 is a view of the clutch expansion spring and actuating lug as viewed along the line 2—2 of Fig. 1;

Fig. 3 is a fragmentary view of the parts shown in Fig. 2 as seen when looking in the direction of the arrow "3";

Fig. 4 is a sectional view taken along line 4—4 of Fig. 1;

Fig. 5 is a fragmentary sectional view along line 5—5 of Fig. 1;

Fig. 6 is a fragmentary view of the Fig. 1 clutch adapted for differential fluid pressure operation;

Figs. 7, 8, and 9 are similar views showing the clutch adapted for operation respectively by magnetic means, by a solenoid and by electrical eddy current means;

Fig. 10 is a fragmentary sectional view along the line 10—10 of Fig. 9;

Fig. 11 is a longitudinal elevational view, partly in section, of a further modification; and Fig. 12 is a sectional view along line 12—12 of Fig. 11.

Referring now to Figs. 1–5, inclusive, my improved clutch is illustrated in a typical environment forming a releaseable driving connection between a driving shaft 10 and a driven shaft 11. The former is preferably adapted to be driven by a prime mover and the latter connected to a load, such as for example, the input shaft of a motor vehicle transmission. It is, however, obvious that my improved clutch is not necessarily restricted in use to the specific relationship shown.

Splined on the driving shaft 10 at 12 is the clutch driving element 13, which for convenience of manufacture is made up of two parts 14 and 15 riveted together at 16. A retaining nut 17 threadedly engages the hollowed-out end portion of the shaft 10 at 18 and serves to retain the clutch element 13 against displacement. The driven shaft 11 is reduced in size at one end and is piloted in the hollow end of shaft 10, an anti-friction bearing rotatably separating the two.

The driven element of the clutch comprises the structure 20, which for convenience of manufacture is made up of the parts 21 and 22 riveted together at 23. The element 20 is splined on the shaft 11 at 24. The portion 22 thereof carries the clutch engaging element which consists of a coil spring 25 staked at one end thereof 25ª (Fig. 2) to the driven portion 22 by pins 26 and 27. The spring 25 is formed of spring material of substantially rectangular cross-section and is wound such that it is adapted to normally closely engage the outer cylindrical surface 28 of the portion 22 of the driven element 20. The opposite end 25ᵇ (Fig. 2) of the spring is adapted for engagement by a lug 29 which is riveted at 30 to the clutch pilot member 31. A pin 25ᶜ (Fig. 2) retains the spring 25 endwise on the portion 22 of the driven element and may also serve as a stop for the lug 29 of the pilot clutch member when the spring is released.

The pilot member 31 is of dished annular construction and is journaled on the driven shaft 11 at 32. A piece of friction material 33 is secured to the inner cylindrical surface of the member 31 and the parts are designed to be assembled in such relation that the friction material 33, which has a conically shaped inner surface, is adapted to telescope the rearwardly extending portion of the driving element 13 as illustrated in Fig. 1. The latter is formed with a conical clutch surface 34 with which the friction material 33 is adapted to engage.

The member 31 is urged by a coil spring 35 into such position that the friction material 33 engages the clutch surface 34 and under such circumstances, clockwise rotation of shaft 10 will cause corresponding rotation of pilot member 31. This will, in turn, cause the lug 29 to exert pressure on the rear end 25$^b$ of spring 25 tending to unwind the spring. Unwinding of the spring 25 will be accompanied by increase in diameter thereof and the outer surface of the spring will engage the inner cylindrical surface 36' of the driving element portion 15 thereby establishing a torque transmitting connection between the elements 13 and 20.

The spring 35 reacts against one race of an anti-friction ball bearing 36, preferably of the sealed type, which is prevented from displacement along shaft 11 by snap ring 37.

It is of course apparent that, as so far described, the clutch will transmit torque in one direction only. This is necessarily true because, if the driving thrust is shifted from shaft 10 to shaft 11 (as would occur upon coasting of the vehicle in a motor vehicle installation) the spring 25 will tend to wind up under inherent tension, there no longer being thrust imposed thereon by lug 29, and thus will disengage from the surface 36'.

In order to prevent overrunning of the shaft 11 relatively to the shaft 10 and to provide two-way torque transmission through the clutch, a reverse type roller clutch device is operatively disposed between the elements 13 and 20. This roller clutch device comprises a set of overrunning rollers 38 which are retained in spaced relation by a cage 39, a spring 40 being provided for urging the cage toward driving position as is conventional in these types of clutch devices. The outer surface of the member 21 is provided with a set of cams 41 in the vicinity of the rollers and these cams are so shaped that the rollers will wedge between the higher portions of the cams and the inner cylindrical surface of the member 14 whenever the member 21 tends to rotate faster than the member 14.

The pilot member 31 may be disengaged from the driving member 13 by a release mechanism which includes an anti-friction release bearing 42. The inner race 43 thereof is staked to the pilot member 31 by snap rings 45 and the outer race of the bearing has a driven fit with the inner cylindrical surface of a release collar 46. The latter has a shoulder 49 adapted for engagement by the depending ends 47 of a release yoke 48 which is keyed at 50 to a shaft 51. The shaft 51 is adapted to be operated by any suitably constructed manually actuated mechanism such as a pedal or a hand operated linkage.

The operation of the clutch will be readily understood from the above description, it being apparent that the spring 35 will act to engage the friction shoe 33 with the conical surface 34 of the driving structure, whereupon the pilot member 31 will rotate in the direction of the driving structure and the lug 29 will unwind the clutch spring 25 carried by the driven structure which will frictionally engage the surface 36 of the driving structure and thereby establish a driving connection between the two structures. Rotation of the shaft 51 in a counterclockwise direction will disengage the friction shoe and conical surface thus permitting release of the said driving connection because the spring 25 will immediately contract due to its inherent tension in response to a release of pressure at the lug 29.

Tendency of the driven structure to overrun the driving structure will also permit the spring 25 to contract and under these conditions the drive will be transmitted through the rollers 38 which will wedge between the members 14 and 21. By properly adjusting the clearance between the rollers 38 and the cams 41 with relation to the slight rotation required to fully engage the spring 25 with the member 15, it is possible to reduce the backlash upon torque reversal to an extremely small amount which is practically unnoticeable. When the pilot member 31 is disengaged, the driving shaft 10 is free to overrun the driven shaft 11, but the driven shaft 11 is prevented at all times from overrunning the driving shaft 10.

With the parts illustrated, it is possible to transmit approximately fifty times more torque through the friction connection established by the spring 25 than through the friction connection between the shoe 33 and the surface 34. Any other mechanical advantage derived may of course be obtained by varying the sizes and adjustment of the parts.

My improved clutch is particularly well adapted for power control and I have illustrated several different applications thereof.

Fig. 6 illustrates the clutch of Fig. 1 adapted for fluid pressure control. The pilot member 31$^a$ in this form of the invention is formed with an overhanging annular portion 52 which forms a fluid pressure cylinder adapted for reciprocation along the shaft 11 against the spring 35$^a$; a bearing 36$^a$ accommodating relative rotation between the pilot member and the spring. A stationary piston 53 surrounds the shaft 11 and has a chamber 54 which communicates with a source of pressure fluid through a pipe 55. The chamber 54 is connected by a passage 56 with the chamber 57 of the cylinder 52. A snap ring 58 prevents rearward axial movement of the piston 53 and suitable rings 59, 60 and 61 are provided to insure a fluid-tight assembly. By providing a suitable valve for controlling admission of pressure fluid to chamber 54 the engagement of the pilot member 31$^a$ with the clutch driving element 13 may be controlled.

Fig. 7 illustrates the Fig. 1 clutch adapted for magnetic control. In this modification the portion 15$^b$ of the clutch driving element 13 is formed with a rear annular portion 62 which carries a field coil 63, the latter being connected by a wire 64 with a collector ring 65. The ring 65 is carried by an insulating ring 68 carried by the member 15$^b$. A carbon brush 66, carried by an insulating plug 67, is connected by means of a wire 69 with a source of electrical potential, the return being effected through the metal of the assembly, which is intended to be grounded in accordance with conventional motor vehicle practice.

The brush 66 is mounted on a stationary part of the assembly 70 through the intermediary of a threaded plug 71 which is provided with a bore for receiving the insulating fitting 67 and a spring 72 which is adapted to urge the brush 66 into contact with the collector ring 65. The clearance between members 15$^b$ and 31$^b$ is slight (in the order of eight to ten thousandths) and a friction ring 73 of asbestos fibre or other suitable clutch facing material is carried by the annular portion 62 as shown.

Upon energization of the field coil 63, the pilot member 31$^b$ will be attracted by the magnetic flux flowing around the magnetic circuit surrounding the coil and will move axially against the force of the spring 35$^b$ into contact with the member 15$^b$. A snap ring 74 limits the movement of the pilot 31$^b$ under the force of the spring 35ᵇ to the limit of the desired clearance.

In the form of the invention illustrated in Fig. 8, an electrical solenoid, generally designated at 75, controls the action of the pilot member 31ᶜ. The solenoid includes a field coil 76 carried by an iron field structure 77 which is mounted on a stationary part 78 of the assembly. The pilot 31ᶜ has a rearwardly extending sleeve portion 79 which is reduced to receive an annular iron core 80, the latter being held against displacement on the aforesaid reduced portion by a ring 81.

The coil 76 is grounded to the metal structure at one end and the other end is adapted to be connected by a wire 82 with a source of electrical energy, a suitable contact structure 83 being provided. Inasmuch as the coil 76 is stationary, no brush or slip ring is necessary.

The pilot 31ᶜ is normally urged axially against the ring 84 by the spring 35ᶜ, and upon energization of the solenoid field coil 76, moves axially toward the left of Fig. 8 to engage the friction shoe 33 of the pilot clutch.

In this modification, the pilot 31ᶜ and the ring 76' which separates the field structure from the part 78 are preferably made of stainless steel which is of extremely high reluctance, thereby confining the flux path to the iron of the solenoid.

Figs. 9 and 10 illustrate the Fig. 1 clutch adapted for eddy-current control. In this form of the device, the stationary part of the assembly 84' carries an annular iron field structure 85. The latter is U-shaped in cross section and carries a field coil 86 adapted for energization through a wire 87 connected to one end thereof, the other end of the coil being grounded. A stainless steel separator ring 88 is interposed between the field structure 85 and the portion 84' and for best results, the driving member 15ᵈ and the pilot 31ᵈ are also preferably made of non-magnetic material.

An iron ring 89 is riveted at 90 to the member 15ᵈ and constitutes the driving element of the eddy-current pilot clutch structure. The ring 89 is provided with a plurality of circumferentially equally spaced teeth 91 around its inner surface. The teeth 91 are adapted to align radially with a similar set of teeth 92 formed on the outer periphery of an iron ring 93 carried by the pilot member 31ᵈ as illustrated. The pilot member has an integral lug 29ᵈ for actuating the spring 25 and is fixed against axial displacement on the driven shaft 11 by washer 94 and snap ring 95.

Energization of field coil 86 will cause magnetic flux to flow through the field structure 85 and across the air gap between the bifurcated portions thereof. The reluctance of the air gap will of course be lowered by the presence of the iron of the members 89 and 93, and because of the juxtapositioned teeth on these members there will be alternate regions of high and low flux density, the flux being high in the regions of the teeth and low in the regions between the teeth.

Upon rotation of the driving member 89 therefore, a point on the latter moves alternately through regions of high and low flux density, thus the flux flowing through said point varies in magnitude and eddy currents are induced in the members 89 and 93. These eddy currents flow in a direction perpendicular to the path of the flux and range in voltage in accordance with the speed of the driving member 89. They induce a flux of their own which reacts with the main flux and tends to prevent relative rotation between the members 89 and 93. This is in accordance with Lenz's law which states, in effect, that change in magnitude of a magnetic field induces a current so directed that its magnetic effect tends to oppose the magnetic change which produced it.

The effect of the flux flowing through the teeth 91 and 92 then, will be to oppose relative rotation between members 89 and 93 and, as 89 is rotated at the speed of the driving shaft 10, the member 93 together with the pilot 31ᵈ will be rotated. So long as there is slippage between members 89 and 93 there will exist an eddy-current-produced torque tending to accelerate the member 93 to the speed of member 89. When the two members are rotating in synchronism, a given point on either of members 89 and 93 will be subjected to flux of constant magnitude and no eddy currents will be induced. Under this condition the holding force tending to keep the members 89 and 93 in synchronism will be entirely magnetic. It is, however, apparent that any tendency for the member 93 to slip will be instantly opposed by the eddy-current-produced torque.

In practice it will be found that the spring 25 grips the member 15ᵈ very quickly after coil 86 is energized and the magnetic effect of the flux flowing through the teeth 91, 92 is sufficient to provide the force necessary to keep the spring expanded.

It is believed to be apparent that the clutches illustrated in Figs. 6 to 10, inclusive, operate similarly to the clutch of Fig. 1, it being intended in all of the various forms of the invention to provide a ratio of approximately fifty to one between the torque transmitted by the pilot clutch structure and that transmitted through the clutch as a whole.

Any of the various modifications are adapted for automatic as well as manual operation as will be apparent to those skilled in the art.

Figs. 11 and 12 illustrate a modified form of the invention wherein reverse torque is transmitted through the pilot clutch structure. In this form of the invention, the overrunning rollers 38ᵉ are of smaller size than those used in the above described forms and are disposed between the driven shaft 11 on which the cams 41ᵉ are formed and the spring energizing lug 29ᵉ, the latter having an integral ring portion 95 adapted to be engaged by the rollers 38ᵉ.

The roller cage 39ᵉ has a lug which engages a groove in the shaft 11 at 96 for maintaining the rollers against axial displacement. In operation, the spring 25 is energized by the lug 29ᵉ which is driven through the pilot 31 during clockwise rotation of the shaft 10. When shaft 10 tends to overrun shaft 11, the lug 29ᵉ is rotated through the friction shoe 33; and when shaft 11 tends to overrun shaft 10, the lug 29ᵉ and pilot member 31 are rotated through rollers 38ᵉ; thus reverse torque is transmitted from shaft 11 to shaft 10 through the friction shoe 33. It is of course apparent that only a small fraction of the torque capacity of the clutch can be handled by the pilot structure. However, in some installations, such as in light vehicles, the torque transmission during coasting is relatively light and is readily handled by the pilot members.

Among other advantages, this form of clutch permits complete disengagement of the drive between the two shafts. When the shaft 51 is oscillated to move the release member 46 axially of shaft 11 against spring 35, the friction shoe 33 is disengaged from the conical surface of the driving structure, the lug 29ᵉ is disengaged from driving engagement with the spring 25, and the rollers 38e cannot establish a drive between the shafts. Thus the driving connection between shaft 10 and 11 is completely broken. In the previously described forms, the overrunning rollers are disposed directly between driving and driven members of the clutch, therefore the normally driven shaft 11 can never overrun the normally driving shaft 10 even when the energizing lug is in non-energizing condition.

It is of course obvious that the construction of the Fig. 11 clutch may be readily applied to the power actuated clutches of Figs. 6-9, inclusive, to provide two-way torque transmission and to permit complete release of drive between the two shafts; consequently a detailed description is believed unnecessary.

I claim:

1. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means; each of said rings having an annular magnetizable portion, a field structure including magnetizable portions straddling said magnetizable portions of said rings and providing a magnetic circuit for said magnetizable ring portions; a field winding for energizing said magnetizable portions; and a plurality of polar projections on one of said rings in its said magnetizable portions arranged in juxtaposition with the said magnetizable portion of the other ring.

2. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means; each of said rings having an annular iron portion; a field structure including iron portions straddling said magnetizable portions of said rings and providing a magnetic circuit for said iron portions of said rings; a field winding for magnetically energizing said iron portions of said field structure and rings; and a plurality of polar projections on one of said iron portions of said rings arranged in juxtaposition to the iron portion of the other ring.

3. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means, each of said rings having a cylindrical iron portion and said portions being arranged in radial juxtaposition; a field structure including iron portions in radial juxtaposition to the said iron portions of said rings providing a magnetic circuit for said iron portions of said rings; a field winding for magnetically energizing said iron portions of said field structure and rings; and a plurality of polar projections on one of said cylindrical iron portions arranged circumferentially in juxtaposition to the iron portion of the other ring.

4. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means, each of said rings having a cylindrical iron portion and said portions being arranged in radial juxtaposition; a field structure including iron portions straddling said iron portions of said rings and providing a magnetic circuit for said iron portions of said rings; a field winding for magnetically energizing said iron portions of said field structure and rings; and a plurality of teeth on one of said cylindrical iron portions arranged circumferentially in juxtaposition to the iron portion of the other ring.

5. In a servo clutch mechanism having a driving member, a driven member, and means for establishing drive between said members, an eddy current structure for actuating said drive establishing means; comprising a rotatable ring drivingly connected to one of said members; a second rotatable ring internally of said first mentioned ring and operatively associated with said drive establishing means, each of said rings including substantially concentric cylindrical iron portions having inner and outer cylindrical surfaces, the iron portion of said first mentioned ring connecting a non-magnetizable portion thereof; a stationary field structure including iron portions providing a magnetic circuit for said concentric iron portions of said rings; a field winding for magnetically energizing said iron portions of said field structure and rings; and a plurality of polar projections on the inner cylindrical surface of the outer of said iron portions and a plurality of polar projections on the outer surface of the inner of said iron portions.

6. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means; each of said rings having a cylindrical iron portion including an inner and an outer surface; a stationary field structure including annular iron portions straddling the iron portions of said rings; a field winding for energizing said iron portions; all of said iron portions being spaced apart radially of each other and the said iron portions of said rings each having a circumferential series of polar projections arranged thereon, one series being on the inner cylindric surface of one iron portion and that on the other being on its outer cylindric surface.

7. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means, each of said rings having an annular magnetizable portion connecting a non-magnetizable portion thereof and said magnetizable portions being so constructed and arranged as to have a surface on each closely spaced from and in juxtaposition with the other; a stationary field structure including magnetizable portions providing a magnetic circuit for said annular magnetizable portions of said rings; a stationary field winding for energizing said magnetizable portions; and a plurality of polar projections on each of said justaposed surfaces of said annular portions for inducing eddy currents in its juxtaposed annular portion upon relative rotation between said rings to thereby cause actuation of said drive establishing means to establish drive between said driving and driven members, said polar projections being adapted for relative alignment upon establishment of said drive for magnetically retaining said drive establishing means in its actuated position.

8. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means; each of said rings having an annular magnetizable portion connecting a non-magnetizable portion thereof and said magnetizable portions being so constructed and arranged as to have a surface on each closely spaced from and in juxtaposition with the other; a stationary field structure including magnetizable portions providing a magnetic circuit for said annular magnetizable portions of said rings; a support for said field structure; a member of high magnetic reluctance between said field structure and support; a stationary field winding for energizing said magnetizable portions; and a plurality of polar projections on each of said juxtaposed surfaces of said annular portions for inducing eddy currents in its juxtaposed annular portion upon relative rotation between said rings to thereby cause actuation of said drive establishing means to establish drive between said driving and driven members, said polar projections being adapted for relative alignment upon establishment of said drive for magnetically retaining said drive establishing means in its actuated position.

9. In a servo clutch mechanism having a driving member, a driven member, and means for establishing drive between said members, an eddy current structure for actuating said drive establishing means; comprising a rotatable ring drivingly connected to one of said members; a second rotatable ring operatively associated with said drive establishing means; each of said rings having an annular iron portion, said iron portions being so constructed and arranged as to have a surface on each closely spaced from and in juxtaposition with the other; an annular shaped field structure of U cross-section having iron leg portions coaxial with said iron portions of said rings and straddling the same; a stationary field winding within said field structure for energizing said iron portions, of said field structure and rings; and a plurality of polar projections on each of said juxtaposed surfaces of said annular portions for inducing eddy currents in its juxtaposed annular portion upon relative rotation between said rings to thereby cause actuation of said drive establishing means to establish drive between said driving and driven members, said polar projections being adapted for relative alignment upon establishment of said drive for magnetically retaining said drive establishing means in its actuated position.

10. In a servo clutch mechanism having a driving member, a driven member, and means for establishing drive between said members, an eddy current structure for actuating said drive establishing means; comprising a rotatable ring including a portion of high magnetic reluctance drivingly connected to said driving member and supporting an annular iron portion of high magnetic permeability; a second rotatable ring including a portion of high magnetic reluctance operatively associated with said drive establishing means and supporting an annular iron portion of high magnetic permeability, coaxial with and in radial juxtaposition with said first mentioned annular iron portion; a stationary field structure having annular iron portions between which said annular iron portions of said rings may rotate, a field winding for energizing said field structure and rotatable iron portions and a circumferential series of polar projections on each of said rotatable annular iron portions and in juxtaposition to each other, the said polar projections of each series being adapted for radial alignment.

LUDGER E. LA BRIE.

REFERENCES CITED

The following references are of record in the file of this patent:

UNITED STATES PATENTS

| Number | Name | Date |
|---|---|---|
| 700,839 | Sessions | May 27, 1902 |
| 1,303,503 | Schnuck | May 13, 1919 |

FOREIGN PATENTS

| Number | Country | Date |
|---|---|---|
| 348,434 | Germany | Jan. 4, 1921 |
| 352,614 | Germany | Apr. 28, 1922 |